Nov. 3, 1942.            J. CARTMELL            2,300,774
AUTOMOBILE FUEL MIXER
Filed Sept. 6, 1940
FIG. 1
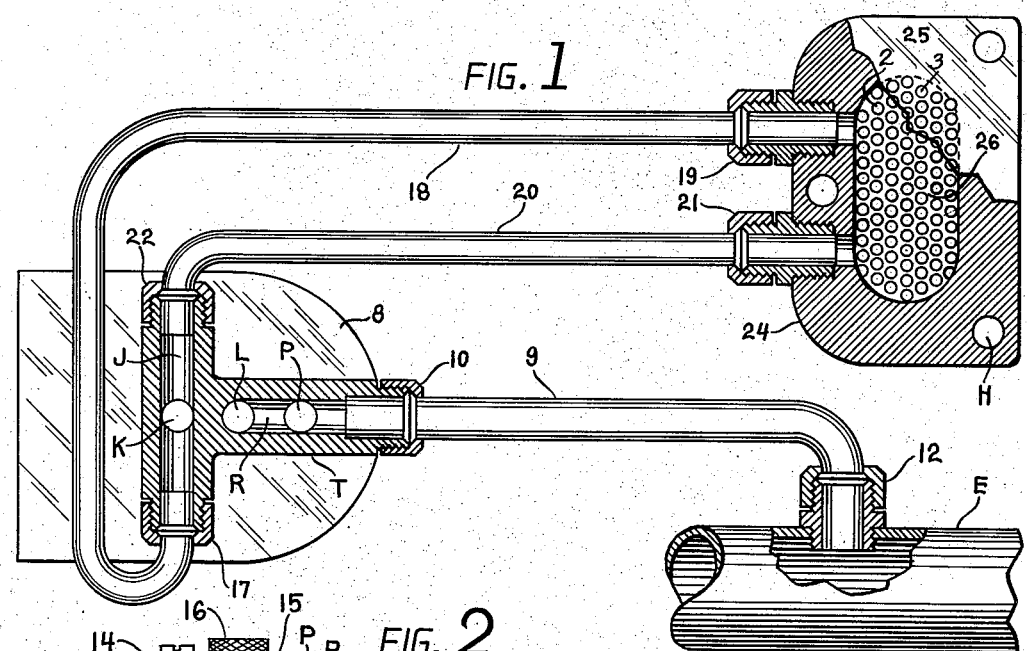
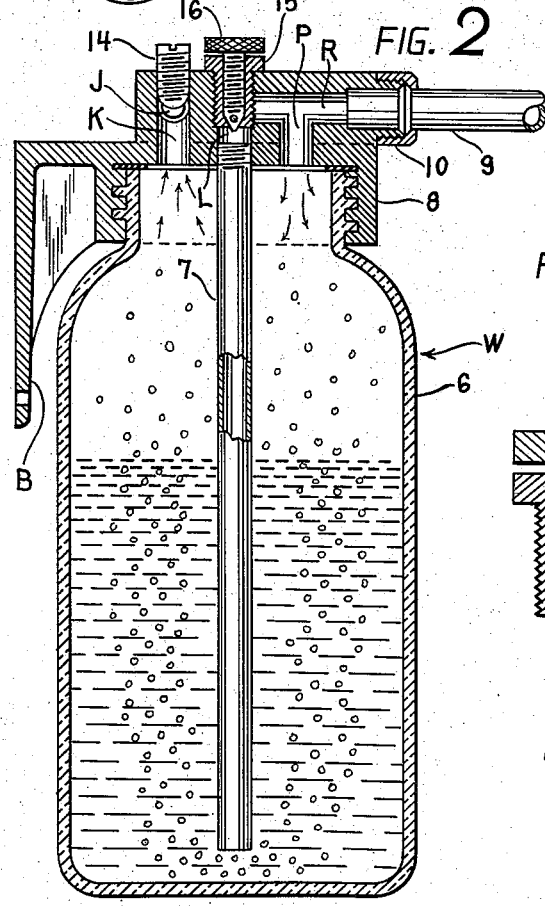
FIG. 2
FIG. 3
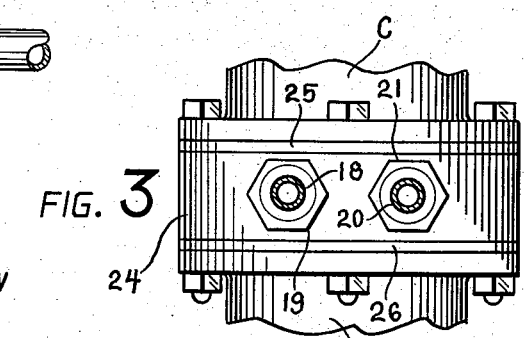
FIG. 4
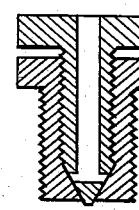
FIG. 5
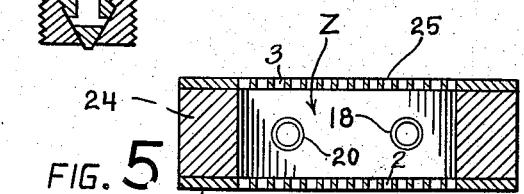
INVENTOR
JOHN CARTMELL
BY O.W. Lee
ATTORNEY Patented Nov. 3, 1942

2,300,774

UNITED STATES PATENT OFFICE 2,300,774

AUTOMOBILE FUEL MIXER

John Cartmell, Jacksonville, Fla.

Application September 6, 1940, Serial No. 355,589

6 Claims. (Cl. 123—198)

This invention relates to an automobile fuel mixer, and provides means for recovering a part of the exhaust gases, mixing them with air and moisture, and then mixing them with the fuel from the carburetor, so that the exhaust gases will again be subjected to the processes of combustion to thereby regain fuel value which would otherwise be lost.

The invention embodies a closed wash tank having a blower tube extending from atmosphere to the bottom of the wash tank and provided with a valve to regulate the flow of air therethrough. A supply conduit opens into the exhaust manifold and communicates with this blower tube and also has a port leading directly into the wash tank. A valve regulates the flow between the supply conduit and the blower tube so as to control the extent to which the exhaust gases will heat the water in the wash tank. That is to say that some of the exhaust gases pass directly into the wash tank through the port and a part pass through the blower tube and bubble up through the water for heating and vaporizing the same. This provides for utilizing considerable quantity of exhaust gases which would otherwise be impossible because of excess heating of the water which would occur from passing the entire consumption through the water. It is necessary to pass sufficient of the exhaust gases through the water to assure adequate vaporization of the water to afford sufficient humidity which is essentially necessary when exhaust gases are burned. Air is admitted to the blower tube along with the exhaust gases so as to provide the required oxygenation, and also to reduce the temperature of the exhaust gases to thereby preclude a hot spot on the wash tank which is preferably made of glass.

A pair of vapor tubes lead from this wash tank and connect to the intake manifold of the automobile engine, so that the suction of the engine maintains the flow of air and exhaust gases through the wash tank, and this flow is controlled by a single valve which regulates the passage between the wash tank and these paired vapor tubes.

The aerated and humidified exhaust gases pass from these vapor tubes into a mixing chamber formed in the intake manifold where they are mixed with the fuel gases from the carburetor and then pass out of the mixing chamber into the intake manifold and are conducted to the engine, ready for combustion.

The invention provides for varying the proportions of air and exhaust gases, and also provides for altering the proportion of exhaust gases which pass through the water in the wash tank, relative to the total consumption; and also provides for regulating the total consumption according to the optimum of efficient operation. Thus, all factors are properly controlled, and the device can readily be coordinated to assure efficient operation over a wide range of operating conditions.

The accompanying drawing shows the preferred embodiment which has been reduced to practice and successively operated with improved results and increased mileage with greater fuel economy.

Fig. 1 shows a plan view of the invention, partly in section, to disclose the communications between the wash tank and the supply tube, and the single communication of the vapor tubes, and also their entrance into the mixing chamber of the intake manifold.

Fig. 2 shows a vertical section of the wash tank and discloses the valve system.

Fig. 3 illustrates the manner of coupling the mixing chamber between the carburetor and the intake manifold.

Fig. 4 shows an enlarged sectional detail of the two purpose valve for the blower tube.

Fig. 5 shows a longitudinal vertical section of the mixing chamber.

The wash tank W comprises a reservoir 6 provided with a closely fitting cover 8 having a T-shaped boss T into which the vapor tubes and the supply tube and the blower tube and their control valves are fitted. The cover 8 is provided with a suitable bracket B for attachment in the position of use.

In Fig. 1 an exhaust manifold is indicated at E, into which the supply tube 9 is fitted by means of a connection 12. A connection 10 couples this supply tube 9 to the bore R which has a port P opening direct into the wash tank. This bore R also communicates with a bore L which extends from atmosphere to the inside of the wash tank. Threaded into this bore L is a valve 15 which is shown in closed position in Fig. 2 but which in operation is unscrewed sufficiently to pass a part of the exhaust gases through the blower tube 7 which is threaded into this bore L. Threaded inside of this valve 15 is an air valve 16 shown in closed position in Fig. 2 but which in operation is opened to admit atmosphere to the blower tube 7 to mix with the exhaust gases passing therethrough. This valve structure 15—16 is a very well known type of hollow stem valve having a cross bore closed by seating in the outer shell as shown in the enlarged sectional detail of Fig. 4, and of course it will be readily understood that unseating of the inner portion 16 will provide an air passage through the outer shell 15.

For delivering the vapors from the wash tank, the cross arms of the T-shaped boss are provided with a bore J having two open ends for coupling to the paired vapor tubes 18 and 20. This bore J opens into the wash tank through the bore K and the extent of opening is controlled by the stud 14 which is threaded into the outer end of the bore K and extends into the bore J to restrict the vapor flow a variable amount according to requirements.

The vapor tubes 18 and 20 are usually led out forwardly from the wash tank, but for convenience of illustration one of them is here shown turned rearwardly and then forwardly. The vapor tube 18 is coupled to the bore J by a connection 17, and the vapor tube 20 is coupled to this same bore J by a connection 22. Similar connections 19 and 21 couple these paired vapor tubes to the manifold block 24 which has a central opening into which these tubes discharge.

This centrally open manifold block 24 is provided with bolt holes such as H for mounting it between a carburetor C and an intake manifold M in the manner illustrated in Fig. 3 which also shows the plates 25 and 26 arranged above and below the manifold block 24 and the assembly tightly secured together by the illustrated bolts. These plates 25 and 26 correspond to the shape of the manifold block 24, and as indicated at 2 and 3 each plate is provided with a multiplicity of perforations grouped to correspond with the central opening in the manifold block in the manner shown in Fig. 1. This structure and arrangement converts the manifold block 24 into a mixing chamber Z as shown in Fig. 5. The paired vapor tubes 18 and 20 open into this mixing chamber Z and discharge their vapors crosswise to the multiplicity of streams of fuel from the carburetor, to assure efficient mixing of the gases. The mixed gases leave the mixing chamber Z in a multiplicity of streams which coalesce in the intake manifold M to assure a uniform fuel mixture.

For efficient mixing of the gases, it is essentially necessary to provide the multiperforated plate 25 between the manifold block 24 and the carburetor, so as to form the carburetor gases into a multiplicity of small streams with increased velocity. It is equally as essential to provide the multiperforated plate 26 between the manifold block 24 and the intake manifold, so as to form the mixing chamber Z wherein the carburetor gases are thoroughly mixed with the vapors from the tubes 18 and 20 and also expanded by reason of the heat of the exhaust gases delivered through these tubes 18 and 20. This multiperforated plate 26 then forms the total fuel mixture into a multiplicity of small streams with a greater velocity than would otherwise exist with a full opening into the intake manifold. This multiperforated plate 26 serves a further purpose of preventing an excess flow through the tubes 18 and 20 relative to the flow through the other plate 25. That is to say, that the omission of the plate 26 would subject the tubes 18 and 20 to the direct suction of the engine which would increase the flow in these tubes and objectionably reduce the flow through the multiperforated plate 25. Thus, the plate 26 serves as a stabilizer and eliminates the necessity for extreme regulation of the valve 14.

In the present instance, the manifold block 24 is shown of the type to fit the well known dual downdraft carburetor commonly used on V-8 automobile engines; however, it should be understood that the paired vapor tubes 18 and 20 are not for this reason, but rather for capacity reasons, and that the paired tubes are employed in any instance with whatever type of manifold block that corresponds with the carburetor. The flow through these vapor tubes 18 and 20 is governed by the valve 14 in accordance with the cylinder displacement of the engine and thus the invention suffices for a wide range of different engines.

In the operation of the invention, it is connected to the automobile engine in the previously described manner, and the reservoir 6 is supplied with water. The engine is then started, and the suction of the engine will draw exhaust gases through the supply tube 9 into the wash tank through the port P and out through the bores K and J into the tubes 18 and 20 for delivery to the engine. The valve 16 is then opened sufficiently to supply the quantity of air necessary for efficient combustion, and the valve 15 is also opened to pass a suitable proportion of the hot exhaust gases through the blower tube 7 for adequate vaporization of the water and for warming the incoming air in cold weather. The total delivery through the tubes 18 and 20 is regulated by the valve 14 to supply as much exhaust gases as is consistent with efficient operation. Whenever increased heating of the water is required, it is a simple matter to further open the valve 15 without altering the valve 16. Thus all of the exhaust gases can be passed through the port P or any desired proportion can be passed through the blower tube 7 into the water in the wash tank to thereby control the vaporization of the water; and the proportion of air can be varied according to requirements; and the total delivery of aerated and humidified exhaust gases can be controlled in accordance with the most efficient operating conditions. The hot exhaust gases which pass through the port P come in contact with the bubbles which are raised by the blower tube 7 and thus thoroughly vaporize any mist that rises in the wash tank. The constant bubbling of air through the blower tube 7 assures thorough mixing of the air, exhaust gases and moisture. The exhaust gases are thus thoroughly mixed with air and moisture before leaving the wash tank, and this hot mixture enters the mixing chamber Z in two streams where it is thoroughly mixed with the multiplicity of streams of fuel from the carburetor, and this total mixture is drawn out of the mixing chamber in a plurality of streams to afford expansion and further mixing while the fuel passes on to the engine cylinders.

When it is desired to use the invention for humidifying air without employing exhaust gases, the supply tube 9 is omitted, and one or both of the valves 15 and 16 are employed to regulate the proportion of air which passes through the blower tube 7 with relation to the remainder which enters through the port P, thus to control the amount of turbulence produced in the water and consequently control the amount of water consumption. If desired, the supply tube 9 can be employed to supply heated air which may all be passed through the port P or part through the blower tube 7 in the previously described manner.

In the present disclosure, I claim as my invention:

1. An automobile fuel mixer comprising a closed wash tank, a blower tube extending to the bottom of said wash tank, an air valve connecting said blower tube to atmosphere, a supply tube for connecting said blower tube to the exhaust manifold of an automobile engine, a valve for controlling the communication between said supply tube and said blower tube, said supply tube also having a port opening direct into said wash tank, a pair of vapor tubes leading from said wash tank, a valve controlling the flow in said vapor tubes, an open manifold block, said vapor tubes connected with the opening in said manifold block, a pair of multiperforated plates spaced apart by said manifold block and forming a mixing chamber therebetween in the opening of said manifold block, said block and said plates being bored for bolting between the carburetor and the intake manifold of an automobile engine.

2. An automobile fuel mixer comprising a closed wash tank, a blower tube extending to the bottom of said wash tank, an air valve connecting said blower tube to atmosphere, a supply tube for connecting said blower tube to the exhaust manifold of an automobile engine, a valve for controlling the communication between said supply tube and said blower tube, said supply tube also having a port opening direct into said wash tank, a vapor tube leading from said wash tank, an open manifold block, said vapor tube connected with the opening in said manifold block, a pair of multiperforated plates spaced apart by said manifold block and forming a mixing chamber therebetween in the opening of said manifold block, said block and said plates being bored for bolting between the carburetor and the intake manifold of an automobile engine.

3. An automobile fuel mixer comprising a closed wash tank, a blower tube extending to the bottom of said wash tank, an air valve connecting said blower tube to atmosphere, a supply tube for connecting said blower tube to the exhaust manifold of an automobile engine, a valve for controlling the communication between said supply tube and said blower tube, said supply tube also having a port opening direct into said wash tank, a pair of vapor tubes leading from said wash tank, a valve controlling the flow in said vapor tubes, an open manifold block, said vapor tubes connected with the opening in said manifold block.

4. An automobile fuel mixer comprising a closed wash tank, a blower tube extending to the bottom of said wash tank, an air valve connecting said blower tube to atmosphere, a supply tube having a port opening direct into the top of said wash tank, a valve connecting said supply tube to said blower tube and affording communication between said port and the first said air valve, a vapor tube leading from said wash tank for connection to the intake manifold of an automobile engine.

5. An automobile fuel mixer comprising a closed wash tank, a blower tube extending to the bottom of said wash tank, and air valve connecting said blower tube to atmosphere, a supply tube having a port opening direct into the top of said wash tank, a valve connecting said supply tube to said blower tube and affording communication between said port and the first said air valve, a vapor tube leading from said wash tank for connection to the intake manifold of an automobile engine, and a valve for controlling the flow in said vapor tube.

6. An automobile fuel mixer comprising a closed wash tank, a blower tube extending to the bottom of said wash tank, an air valve connecting said blower tube to atmosphere, a supply tube for connecting said blower tube to the exhaust manifold of an automobile engine, a valve for controlling the communication between said supply tube and said blower tube, said supply tube also having a port opening direct into said wash tank, a vapor tube leading from said wash tank, a valve controlling the flow in said vapor tube, an open manifold block, said vapor tube connected with the opening in said manifold block.

JOHN CARTMELL.